United States Patent
Ahuja et al.

(10) Patent No.: US 11,061,586 B1
(45) Date of Patent: Jul. 13, 2021

(54) SYSTEM FOR DYNAMICALLY DETERMINING ACCESS CONSTRAINTS OF DATA-REPOSITORY OBJECTS

(71) Applicant: Veritas Technologies LLC, Santa Clara, CA (US)

(72) Inventors: Ruchika Ahuja, Pune (IN); Bhushan Pandit, Pune (IN)

(73) Assignee: Veritas Technologies LLC, Santa Clara, CA (US)

(*) Notice: Subject to any disclaimer, the term of this patent is extended or adjusted under 35 U.S.C. 154(b) by 0 days.

(21) Appl. No.: 15/819,864

(22) Filed: Nov. 21, 2017

(51) Int. Cl.
*G06F 3/06* (2006.01)
*G06F 13/16* (2006.01)
*G06F 13/18* (2006.01)

(52) U.S. Cl.
CPC .......... *G06F 3/0622* (2013.01); *G06F 3/067* (2013.01); *G06F 3/0659* (2013.01)

(58) Field of Classification Search
CPC ....... G06F 3/0622; G06F 3/0659; G06F 3/067
See application file for complete search history.

(56) References Cited

U.S. PATENT DOCUMENTS

| | | | | |
|---|---|---|---|---|
| 6,289,462 B1 * | 9/2001 | McNabb | ............. | G06F 21/6218 726/21 |
| 7,539,836 B1 * | 5/2009 | Klinkner | ............... | G06F 3/0605 711/170 |
| 9,674,202 B1 * | 6/2017 | Margel | .................. | H04L 63/105 |
| 10,362,019 B2 * | 7/2019 | Canavor | ............. | H04L 63/0853 |
| 2007/0143827 A1 * | 6/2007 | Nicodemus | ......... | G06F 21/6218 726/2 |
| 2008/0222734 A1 * | 9/2008 | Redlich | ................. | G06F 21/577 726/26 |
| 2009/0254985 A1 * | 10/2009 | Weller | .................... | G06F 21/53 726/11 |
| 2012/0278885 A1 * | 11/2012 | Hira | ....................... | G06F 21/645 726/22 |
| 2014/0358944 A1 * | 12/2014 | Brower, Jr. | ........ | G06Q 10/0639 707/748 |
| 2016/0124663 A1 * | 5/2016 | Mitkar | ................ | G06F 16/1734 711/162 |
| 2016/0147798 A1 * | 5/2016 | Marrelli | ................ | G06F 16/215 707/692 |
| 2017/0185344 A1 * | 6/2017 | Kirshenbaum | ..... | G06F 12/1458 |
| 2018/0113638 A1 * | 4/2018 | Petersen | ............... | G06F 3/0683 |

* cited by examiner

*Primary Examiner* — Charles Rones
*Assistant Examiner* — Tong B. Vo
(74) *Attorney, Agent, or Firm* — Campbell Stephenson LLP (57) ABSTRACT

Various systems and methods are provided for calculating a data criticality score upon ingesting a data object into a data storage system. This data criticality score can be used to control subsequent access requests for the data object. In one embodiment, a computer system receives a data object at a first node comprising a decision engine. The decision engine generates a data criticality score based, at least in part, on one or more inputs related to the data object. After calculating the data criticality score, the system uses the data criticality score to determine whether a given action is allowable for the data object. After determining whether the given action is allowable, the system receives a user request to perform a first action on the data object. The system then determines whether the user request should be granted with respect to the first action, and if allowable, performs the first action.

20 Claims, 9 Drawing Sheets

SYSTEM FOR DYNAMICALLY DETERMINING ACCESS CONSTRAINTS OF DATA-REPOSITORY OBJECTS

BACKGROUND OF THE DISCLOSURE

Field of Endeavor

Computer technology, and more particularly controlling access to data objects in a shared storage system.

State of the Technology

Access control functionality governs the way in which various permissions are determined with respect to a data object. Access control functionality enables a system to specify which users can access various data objects stored in a system, which resources or data objects each such user can access, and which operations each such user can perform on those data objects, among other potential constraints and permissions. Typically, imposing security constraints on data stored in a repository is done at a container, file, or similar level, rather than at the object level. Among other difficulties, applying such access constraints on an object-by-object basis is very costly in terms of computing resources, such as processing power, bandwidth, and so forth. However, such higher-level constraints can limit the accessibility to a given data object, and often lead to access controls that are either too restrictive or to permissive, the latter of which can allow unwarranted access to critical information.

SUMMARY OF THE DISCLOSURE

The disclosure generally includes methods, computer program products, computer systems, and the like, that provide for calculating a data criticality score upon ingesting a data object into a data storage system, such as a cloud storage network, software defined storage ("SDS"), a system using general data protection regulation ("GDPR"), a policy-based authorization system, or an archive storage system, among other types of storage systems. This data criticality score can then be used to control subsequent access requests for the data object, including, for example, controlling which actions can be performed on the data object and which user accounts should be granted access to perform any such actions on the data object. In one embodiment, a computer system receives a data object at a decision engine, which can include a decision tree or other algorithm, in addition to other potential features needed for proper functionality. The decision engine can be stored on a first node (e.g., a computer, or similar) in a network.

The decision engine is then used to generate a data criticality score, where the data criticality score is based, at least in part, on one or more inputs related to the data object. In one embodiment, these inputs can include at least one of: classification information related to the data object, a user account associated with the data object, location information associated with the data object (such as, e.g., a file path or access point), a time associated with the data object (e.g., the time created, the time last accessed, or the time last modified), a retention value associated with the data object (e.g., the expiration date of the data object), and/or a number of access attempts associated with the data object. In certain embodiments, the inputs can also include other variables, as well as one or more default values. In certain embodiments, one or more of the variables can be weighted more heavily than at least one other variable. In certain embodiments, the specific inputs needed, the default values, and the weighting of the various variables can be configured by a user (such as, e.g., a system administrator) prior to ingesting the data object.

After calculating the data criticality score, the system (e.g., the decision engine, or another system component connected to the decision engine) uses the data criticality score to determine whether a given action is allowable with respect to the data object. In certain embodiments, the decision engine (or other system component) can use the data criticality score to determine whether each action of a set of actions is allowable with respect to the data object, such that one or more actions of the set of actions may be allowable, but one or more other actions of the set of actions may not be allowable. In certain embodiments, the system can also migrate the data object to a different repository that is either more secure or less secure than the current repository, based on the data criticality score. In other embodiments, the system can delete the data object, or can audit the action for later review. In other embodiments, other actions are possible in addition to the example actions provided herein.

Subsequent to determining whether the action or each action of the set of actions are allowable, the system (e.g., the decision engine, or another system component) can receive a user request to perform a first action on the data object. In light of the foregoing procedures, the system then determines whether the user request should be granted with respect to the first action; and, in response to determining that the user request should be granted with respect to the first action, performing the first action on the data object without having to generate and/or calculate any further information at run time regarding the permissibility of performing the first action on the data object.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

This disclosure provides methods, computer program products, computer systems, and the like, for calculating a data criticality score upon ingesting a data object into a data storage system. This data criticality score can be used to control subsequent access requests for the data object, including, for example, controlling which actions can be performed on the data object and which user accounts should be granted access to perform any such actions on the data object. Subsequent to determining whether the action or each action of the set of actions are allowable, the system (e.g., the decision engine, or another system component) can receive a user request to perform an action on the data object. In light of the disclosure provided herein, the system then determines whether the user request should be granted with respect to the first action; and, in response to determining that the user request should be granted with respect to the first action, performing the first action on the data object without having to generate and/or calculate any further information at run time regarding the permissibility of performing the first action on the data object. Further details will be provided below in conjunction with the discussion of the various figures included herewith.

Figure 1A:
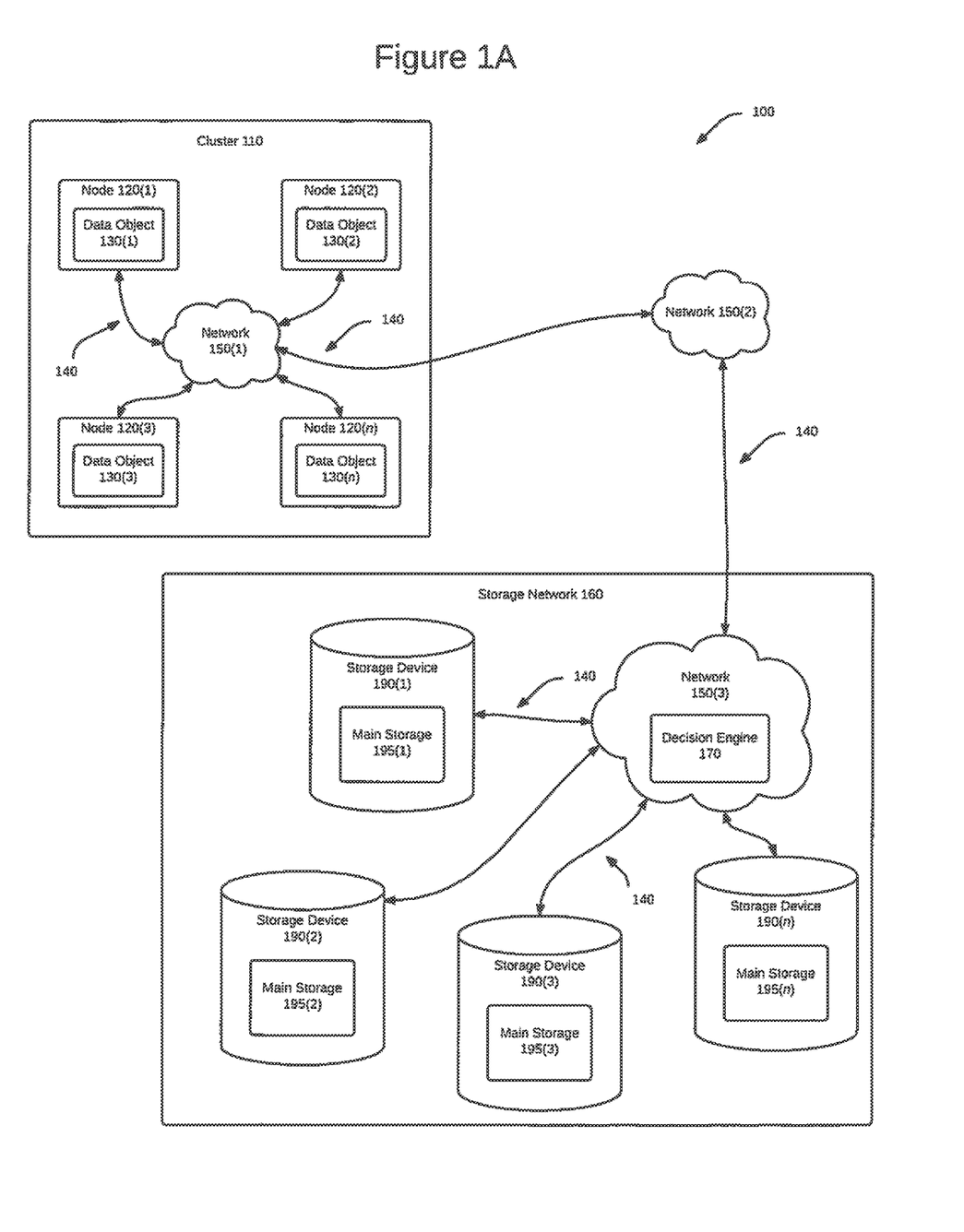
FIG. 1A is a block diagram depicting an example computing environment, according to one embodiment of this disclosure.

FIG. 1A shows an example computing environment 100 that includes a cluster 110 of nodes 120(1)-12(n) (collectively, "node 120"). Each of these nodes can be any computing device, such as a personal computer, laptop computer, notebook computer, personal computing device (e.g., a cell phone), a server, or any other personal computing device. As used throughout this disclosure, the letter n is used to indicate a variable number of devices or components. Although the letter n is used in describing a variable number of instances of each of these different devices and components, a repeated use of the letter n does not necessarily indicate that each device and component has a same number of n instances implemented in the example system discussed herein, or in any other embodiment of this invention.

Each node 120 can store at least one data object, such as data objects 130(1)-130(n) (collectively, "data object 120"). Although FIG. 1A only depicts only example data object 130 for each node 120, in practice each node 120 can, and generally will, store multiple data objects 130 at any given time. Each data object 130 can be any sort of computer data, such as any sort of file (e.g., a word processing document, an image, a movie, a song, and so forth), folder, directory, program, script, and so forth. In addition, although not expressly depicted in FIG. 1A, each node 120 can include other information and functionality as is used in the operation of a computing device.

As can be seen from FIG. 1A, each node 120 is connected via a connection 140(1)-140(n) (collectively, "connections 140") to a first network 150(1) among a plurality of networks 150(1)-(3) (collectively, "network 150"). (The reader will appreciate that, for the sake of space, only certain of the connections are specifically labeled with the number 140.) Each of the connections 140 can be any sort of wired and/or wireless network connection, such as an Ethernet connection, a Fiber Optic connection, a BLUETOOTH connection, and so forth, including various combinations of the foregoing technologies. Each network 150 can be any sort of network, including a local area network ("LAN"), wide area network ("WAN"), storage area network ("SAN"), the Internet, an intranet, and so forth. Although three instances of network 150 are depicted in FIG. 1A for the sake of explanation, in practice more or less instances of network 150 can be used.

Through the various connections and networks, each node 120 is ultimately connected to a storage network, such as, e.g., storage network 160. Storage network 160 can be any type of storage network, such as, e.g., a cloud storage network, software defined storage ("SDS"), archive storage, direct attached storage ("DAS"), a storage area network ("SAN"), or other types of storage or storage networks. System 100 also includes a decision engine, such as, e.g., decision engine 170. For the sake of this example, decision engine 170 is depicted as being located in network 150(3) and more specifically within storage network 160. In practice, however, decision engine 170 can be located anywhere in system 100. In certain embodiments, decision engine 170 can include one or more modules (or other components) that may work together despite being located on distinct physical devices, stored in distinct locations in memory, or the like. The decision engine will be discussed in more detail below.

Storage network 160 also includes one or more storage devices, such as storage devices 180(1)-180(n) (collectively, "storage devices 180"). Each storage device 180 will generally include at least a main storage, such as main storage 190(1)-190(n) (collectively, "main storage 190"). Although FIG. 1A only depicts only main storage 190 for each storage device 180, in practice each storage device 180 can, and generally will, include more than one form of storage. Each main storage 190 can be any form of non-volatile, non-transient computer-readable storage medium, such as a hard disk drive, a solid state memory device, or an archive storage medium (e.g., one or more magnetic backup tapes). In addition, although not expressly depicted in FIG. 1A, each storage device 180 can include other forms and/or instances of storage. In certain embodiments, each main storage 190 can be spread out among one or more distinct storage units that can work together to collectively store the relevant data.

Figure 1B:
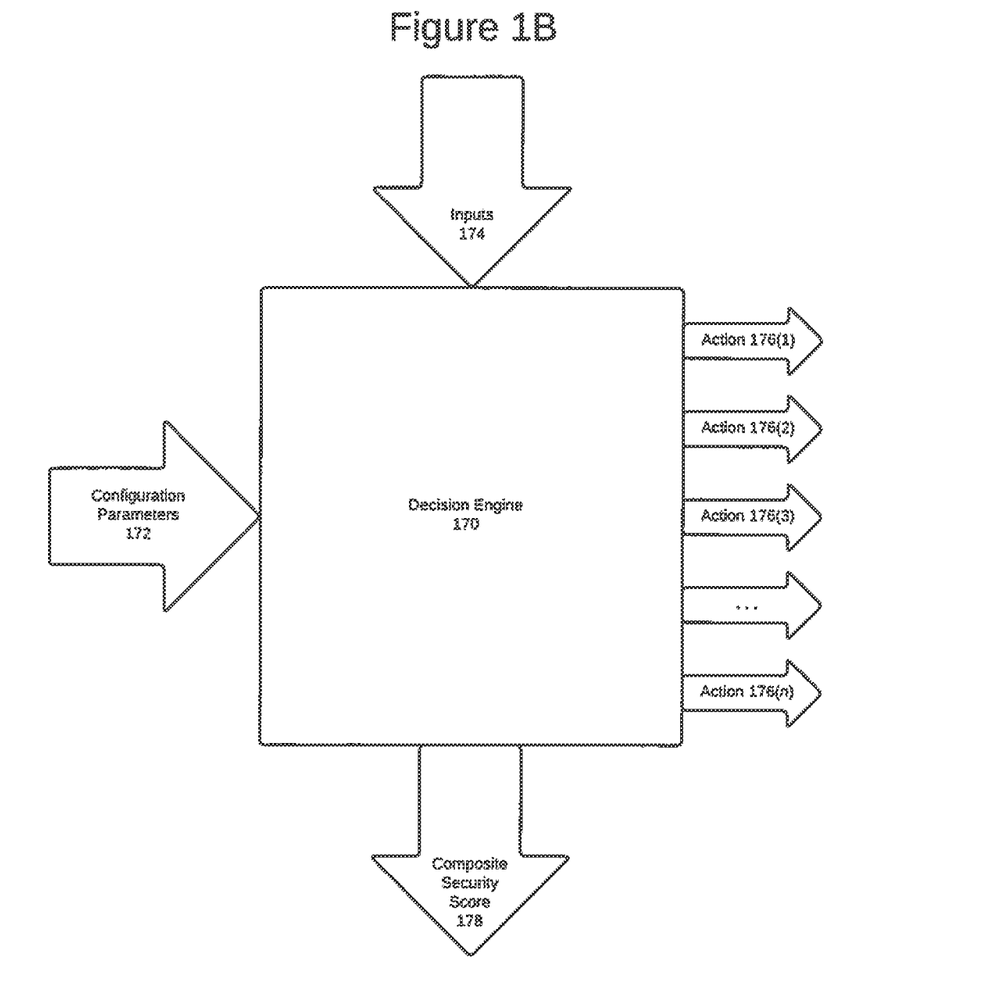
FIG. 1B is a block diagram that provides additional details of the example decision engine included in the example computing environment of FIG. 1A, according to one embodiment of this disclosure.

FIG. 1B shows an enhanced view of decision engine 170. In one embodiment, a decision engine, such as decision engine 170, is a customizable rules-based decision engine that can perform various actions automatically based on a data criticality score generated by the system and methods disclosed herein, which systems and methods will be discussed in more detail below. In various embodiments, this decision engine can be controlled by a script or a decision tree, among other possible options. Prior to ingesting any given data object, this decision engine can be configured via one or more engine configuration parameters 172, which can be external inputs distinct from the code that is internal to the decision engine. Although not expressly shown in FIG. 1B, default parameters can also be provided, such as by being specified in the internal code.

Decision engine 170 also takes various metadata as inputs, such as, e.g., inputs 174. These inputs can include classification information related to the data object, a user account associated with the data object, location information associated with the data object (such as, e.g., a file path or access point), a time associated with the data object (e.g., the time created, the time last accessed, or the time last modified), a retention value associated with the data object (e.g., the expiration date of the data object), a number of access attempts associated with the data object, and/or one or more access control lists associated with the data object. In other embodiments, other inputs 174 can be used. In certain embodiments, inputs 174 can take the form of data or information other than metadata, or can alternately be a combination of metadata and other data or information. In certain embodiments, one or more of the specific inputs 174 that are needed to generate the score can be hardcoded into the decision engine (although the values of those inputs must still either be read from the data object, from the default parameters, or from a combination of the two). In other embodiments, the specific inputs 174 that are required can be specified via the configurations parameters 172. In still other embodiments, the specific inputs 174 that are required can be determined by a combination of the foregoing options.

Once the values of the necessary inputs have been determined, decision engine 170 can then generate a composite security score, or data criticality score, upon ingestion of the data object. This data criticality score can be based upon, e.g., the data object that is being ingested, one or more requested operations associated with the data object being ingested (such as, e.g., actions 176(1)-176(n) ("collectively, actions 176"), the inputs 174 (e.g., metadata of the data object being ingested), and/or one or more default parameter values. In one embodiment, a high data criticality score can indicate that the data object is more critical and/or more sensitive, which may conversely limit the actions that can be performed on that data object by various users, which users can access the data object, and so forth. In another embodiment, a lower data criticality score can be used to indicate that the data object is more critical and/or more sensitive, and that the data object should be treated as such.

For instance, if the data criticality score is high, the system may be configured to determine that the particular data object being analyzed requires a higher level of protection or access control than other data objects. In other embodiments, the system may be configured to determine that the repository in which that data object is stored requires a greater level of protection or access control that other repositories. In other embodiments, the system may be configured to determine that the source from which the data object was received requires a greater level of protection or access control that would otherwise be given. Moreover, in certain instances, the system may trigger an alert that the particular source from which the data object was received requires a software patch and/or increased security, due to the fact that the source machine is hosting a piece of sensitive or critical data. Moreover, in certain situations, the systems and methods disclosed herein can be applied to automatically revoke a user's access to a given data object based on the data criticality score. The specific functionality and actions that can be taken will be discussed in more detail below.

Upon ingesting the data object into the decision engine, the system can feed the relevant inputs 174 (e.g., metadata or other information) into the decision engine and use those inputs to generate the data criticality score. Then, based on the generated score, the decision engine can determine which actions 176 can or cannot be performed on that object, the extent to which those actions 176 can be performed, and so forth. As such, permissions can be assigned to specific actions that can be performed on each data object on an object-by-object basis, rather than limiting whether or not a given user can simply access a given object. As such, multiple data objects within any given directory level (or within any other organizational structure) can have a different data criticality score than other data objects in the same directory level (or organizational structure), and therefore have a different set of permissions or allowable actions.

The functionality discussed above, and elsewhere herein, provides an added degree of flexibility, specificity, and access control on an object-by-object and action-by-action basis. Moreover, the functionality disclosed herein can be used in systems that already use access control lists (or other access control policies or functionality) in order to provide a second level of access control to the objects, which will make both the data objects and the system as a whole more secure. As will be discussed further below, all of this functionality can be performed when the data object is being ingested into the system (or when an action occurs that triggers the system to regenerate the score and/or to generate a new score, among other potential times). As such, this functionality overcomes certain of the problems that were present in the prior art, such as, e.g., having to classify objects in bulk at the container or folder level, and/or having to expend significant resources to later classify objects individually at the object level.

Figure 2:
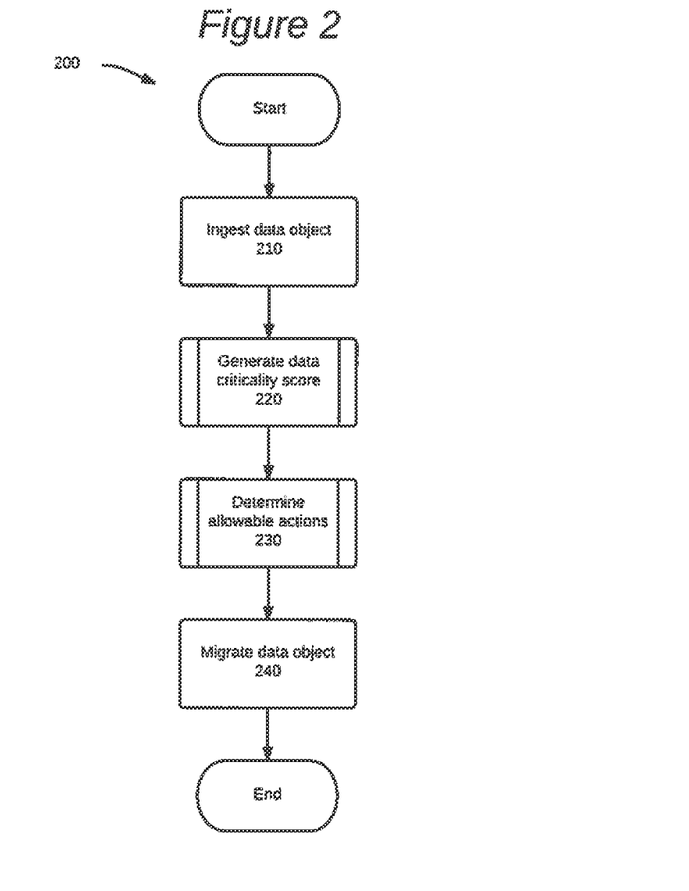
FIG. 2 is a flowchart depicting various actions that can be performed upon ingesting a data object, according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIGS. 1A and 1B. In one embodiment, method 200 is performed by a decision engine, such as, e.g., decision engine 170.

Method 200 begins at 210, where the system ingests a data object. The data object can be any file or other data object, such as an email, a document, a program, a script, and so forth. The process of ingesting a data object can include storing a data object in a data store. In one embodiment, the data store can be an archiving system or similar data store. In other embodiments, the data store can be a repository, data share, database, or other data storage system or technology. In certain embodiments, one or more steps of method 200 can be performed on data objects that have already been stored in a data store, thereby eliminating the need to perform step 210 in certain embodiments.

In step 220, method 200 generates the data criticality store. This functionality is discussed in significantly more detail both above, in conjunction with FIGS. 1A and 1B, and below, in the discussion of FIG. 5 and method 500, and therefore will not be repeated here. At step 230, method 200 determines one or more allowable actions that can be performed on (or by) the data object. This functionality is discussed in significantly more detail below in the discussion of FIG. 6 and method 600, and therefore also will not be repeated here.

In step 240, method 200 may optionally migrate the data object to a different storage tier based on the data criticality score. For instance, if the data criticality score is high, the system may be configured to determine that the particular data object being analyzed requires a higher level of protection or access control than other data objects. In such a situations, method 200 may optionally move more sensitive data to a data storage location that has more stringent security policies (such as, e.g., a more stringent access control list policy) associated with that storage tier. Although not expressly shown in FIG. 2, in other embodiments the system may be configured to determine that the repository in which that data object is stored requires a greater level of protection or access control that other repositories. Following step 240, method 200 ends.

Figure 3:
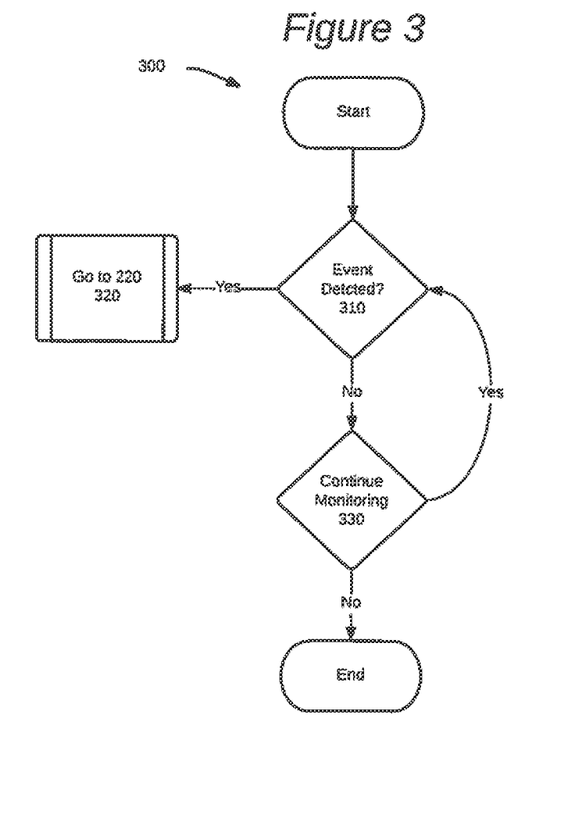
FIG. 3 is a flowchart depicting various actions that can be performed to monitor for and respond to the detection of an event, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1A, 1B, and 2. In one embodiment, method 300 is performed by a decision engine, such as, e.g., decision engine 170. In other embodiments, method 300 is performed by one or more threads, daemons, processes, or other such constructs (collectively, "threads") that are distinct from decision engine 170.

In step 310, method 300 monitors for an event to occur. By way of example, an event can be a user event. A user event can be any of various actions performed by a user, system administrator, or other such person, that require the system to regenerate the data criticality score and/or to generate a new data criticality score. For instance, a user event can be an attempt to access the data object, an attempt to access a different data object, an attempt to copy the data object, and so forth. In various embodiments, the event can be any input or action that notifies the system that one or more of various external events have occurred apart from the system itself, such as, e.g., a user (or custodian) being promoted within his or her company, fired from his or her company, or otherwise experiencing a change to his or her role, job title, employment status, and so forth. In certain embodiments, the event can also be an automated event. Moreover, the event can occur apart from any direct user interaction, such as the passage of a certain amount of time. In various embodiments, two or more of these event types can be combined in the same embodiment, as well as other examples consistent with the specific examples discussed herein.

If any such event has occurred, method 300 goes to step 320, which calls on (or otherwise invokes the functionality of) step 220. In embodiments where method 200 and method 300 are performed by distinct threads, method 300 can call or otherwise invoke method 200 to perform step 220 at this point. In any such event, method 200 can regenerate the data criticality score and/or generate a new data criticality score for the data object at this point. If no such event is detected in 310, method 300 proceeds to step 330, at which point method 300 determines if the method should continue monitoring for an event. In the typical situation where step 330 determines that method 300 should continue monitoring for an event, the method will return to 310 and continue monitoring. In various embodiments, one or more steps of method 300 can be performed by "listening" or "waiting" for an event to occur. If step 330 determines that method 300 should not continue monitoring for an event, method 300 ends.

Figure 4:
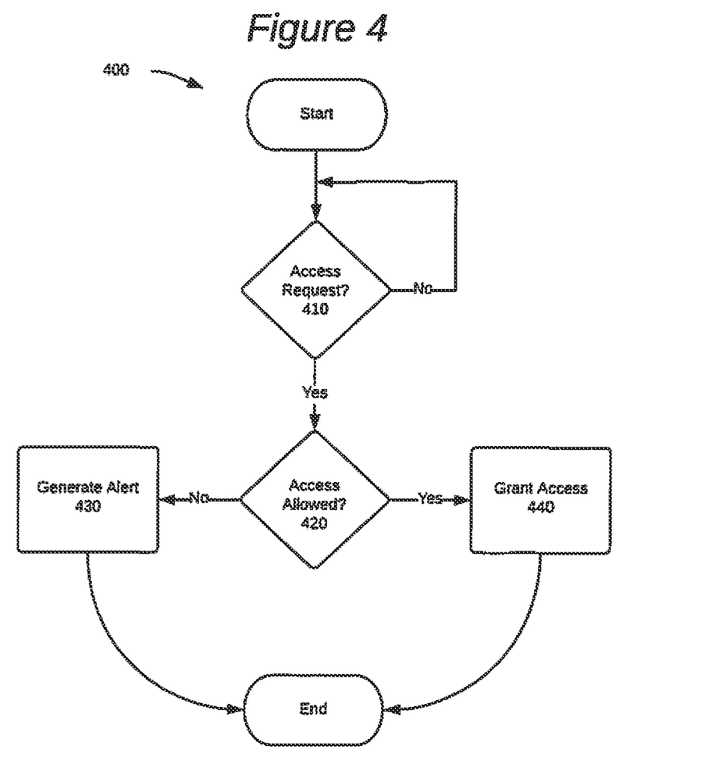
FIG. 4 is a flowchart depicting various actions that can be performed to monitor for and respond to the detection of a request for access to a data object, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1A, 1B, and 2. In one embodiment, method 400 is performed by a decision engine, such as, e.g., decision engine 170. In other embodiments, method 400 is performed by one or more threads, daemons, processes, or other such constructs (collectively, "threads") that are distinct from decision engine 170.

In step 410, method 400 determines if an access request has been received for the data object. If an access request has been detected by method 400, method 400 proceeds to step 420. If no such access request has been detected, then method 400 can continue to monitor for a user event to occur while other actions are performed. As is also the case with method 300, method 400 can be performed by one or more thread(s) that are distinct from the thread(s) performing method 200 and/or method 300, such as a separate "monitoring" thread. In one embodiment, step 410 can be performed by "listening" or "waiting" for any such access request to occur.

At step 420, method 400 determines if the access request is allowed and should be granted. The access request typically includes a request to perform a specific operation on the data object, such as to read the data object, copy the data object, modify the data object, rename the date object, move the data object, or execute the data object (e.g., when the data object is a computer program), among such potential operations for which access to the data object may be requested. The evaluation of step 420 is performed by comparing the specific action that has been requested to the allowable actions that were determined in step 230 (and which will be discussed in more detail in conjunction with method 600 and FIG. 6, below).

If method 400 determines in step 420 that access to perform the requested operation is not allowed, then method 400 proceeds to step 430 and generates an alert. For instance, in certain instances, the system may trigger an alert that the particular source from which the data object was received requires a software patch and/or increased security, due to the fact that the source machine is hosting a piece of sensitive or critical data. In certain embodiments, method 400 can include various levels of alarms. For instance, certain high-value or very critical information may cause one or more alerts to be generated when access is denied to a data object, when access is provided to a person with a low clearance level, or simply any time that any user requests and/or is granted access to the data object (which would be particularly relevant in the case of high-value or very critical information). Moreover, in certain situations, the systems and methods disclosed herein can be applied to automatically revoke a user's access to a given data object based on the data criticality score. If method 400 determines in step 420 that access to perform the requested operation is allowed, then method 400 proceeds to step 440 and grants access to the object to perform the requested operation. Following either step 430 or step 440, method 400 then ends.

Figure 5:
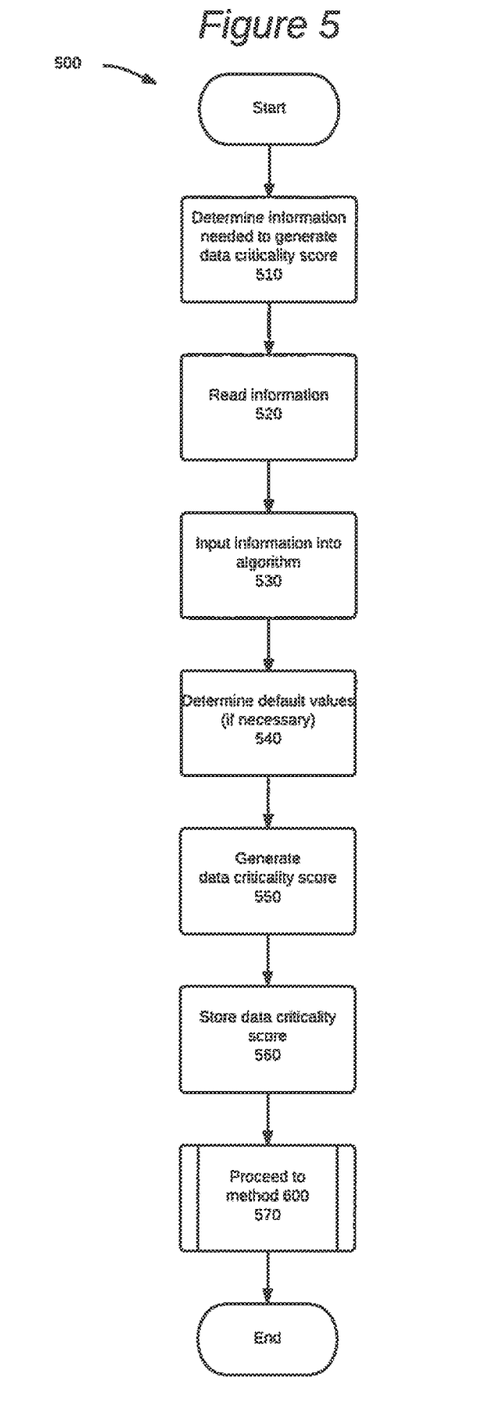
FIG. 5 is a flowchart for calculating data criticality score, according to one embodiment of this disclosure.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIGS. 1A and 1B. In one embodiment, method 500 is performed by a decision engine, such as, e.g., decision engine 170.

Method 500 begins at 510, where the system determines what information is needed to generate the data criticality score for a data object, such as, e.g., the data object that was ingested in step 210. In step 510, method 500 determines what categories of metadata and/or other information will be needed as inputs for the method to generate the data criticality score. For instance, and in various embodiments, these forms of metadata can include attributes such as: (1) a classification of the data object (such as, e.g., confidential, private, top secret, personal, and so forth), which may take the form of a classification tag; (2) a person associated with the document (such as, e.g., an author, sender, creator, reviewer, and so forth; as well as a role or title associated with any such person); (3) location information (such as, e.g., a file path or access point); (4) a retention score (such as, e.g., a data object that is to be retained for a longer time may be treated as more confidential or more secure than a data object that is to be retained for a shorter time); (5) permission information; and (6) a number of attempts to access the data object. In other embodiments, other information or combination of information can be used as inputs in calculating the data criticality score. The inputs that are required in various implementations of this disclosure can also be configured, such as, e.g., by a system administrator.

In step 520, method 500 reads the values of the specific inputs that are needed, as was determined in step 510. For instance, and by way of example only, method 500 may determine that the "classification" of the data object is "confidential," and that the author of the data object is a Vice-President of the company, among other potential values of the specific inputs that are needed, as was determined in step 510. In one embodiment, these values can be read from the data object itself. In other embodiments, these values can be read from metadata related to the data object. In other embodiments, these values can be read for other sources or locations.

In step 530, method 500 can then input the relevant values into the algorithm used to generate the data criticality score. In step 540, method 500 determines if any default values are needed. For instance, a default value may be necessary for a specific attribute if the method was unable to determine a value for that attribute in step 520. In certain embodiments, default values can be specified for one or more of the default attributes. In one embodiment, such default values can be specified in the source code of the algorithm. In another embodiment, such default values can be configured by a user, such as, e.g., by a system administrator. In other embodiments, the system can be configured to simply ignore the related attribute if method 500 cannot determine a value for that attribute in step 520 (or otherwise).

Based on the attributes, method 500 generates the data criticality score in step 550. At this point, each of the attributes mentioned above can individually be thought of as a "vector." In one embodiment, each of these "vectors" can be counted evenly when calculating the data criticality score. In alternative embodiments, one or more of these vectors can be weighted to make that vector count more (or less) than the others. In one embodiment, the weight for each vector can range from 0 to 10, inclusive. In other embodiments, other values are possible.

Figure 6:
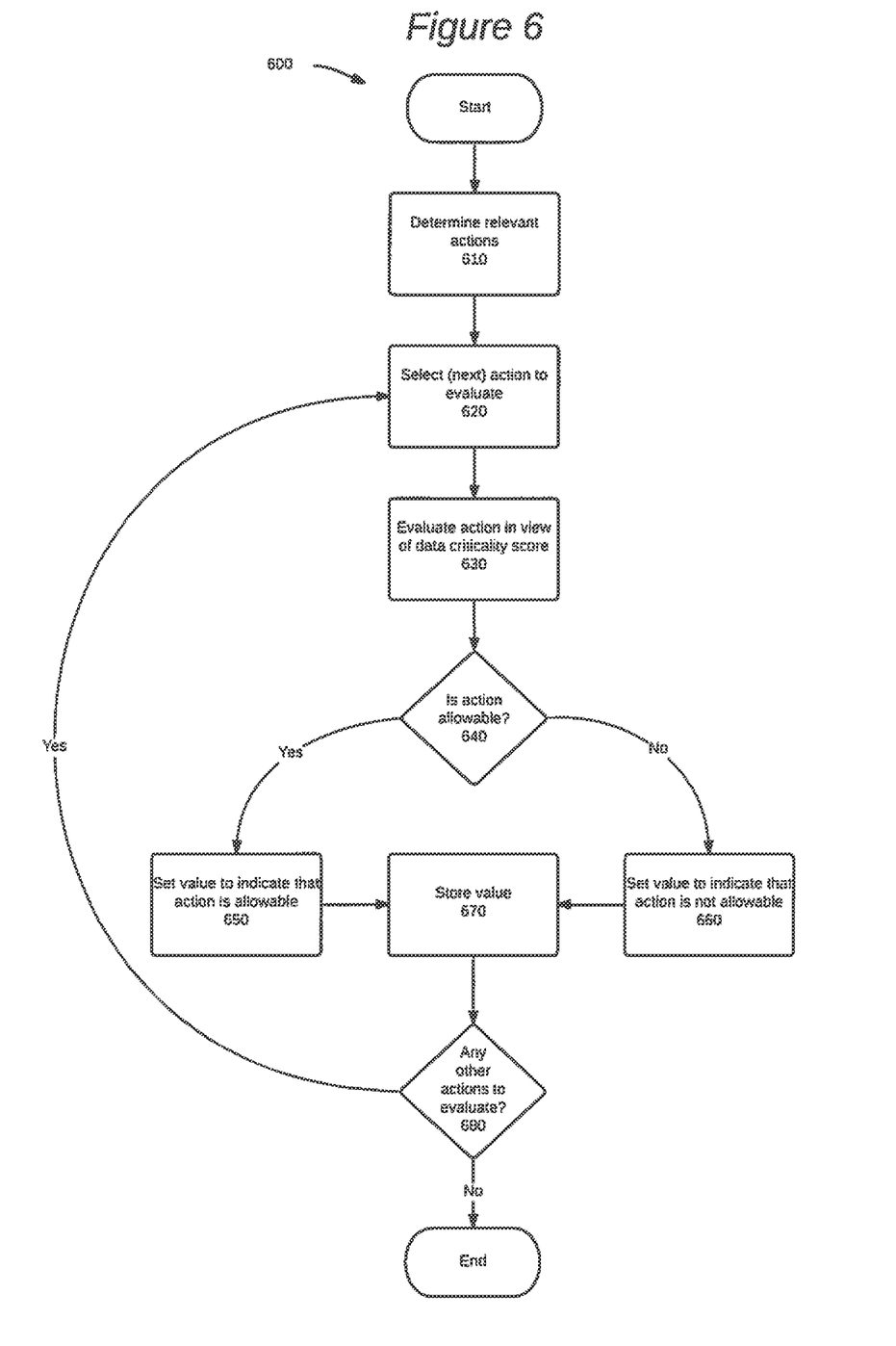
FIG. 6 is a flowchart for determining allowable actions, according to one embodiment of this disclosure.

In step 560, method 500 can store the data criticality score generated in step 550. In one embodiment, this value can be stored in a short-term and/or transient and/or volatile form memory, such as, e.g., RAM, flash memory, or a cache. In other embodiments, this value can be stored in a different form of computer memory, including a long-term and/or non-transient and/or non-volatile form of memory, such as hard disk drive. In other embodiments, the data criticality score could be exported to other products or systems, such as file servers. After completing step 560, method 500 can proceed to method 600, as is depicted in step 570.

FIG. 6 is a flowchart of a method 600 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 600 is described with reference to elements such as those described in connection with FIGS. 1A and 1B. In one embodiment, method 600 is performed by a decision engine, such as, e.g., decision engine 170.

Method 600 begins at 610, where the method determines one or more potential actions that are relevant with respect to the data object being processed. As non-limiting examples provided for the sake of facilitating the instant discussion, these actions may include reading the data object, modifying the data object, moving the data object, renaming the data object, copying the data object, deleting the data object, downloading the data object, and/or executing the data object (such as, e.g., if the data object is an executable program, script, or so forth). These actions may also include one or more of actions 176, examples of which are discussed elsewhere in this disclosure. Other actions can include associating the data object with various access claims, users, and/or groups.

Upon determining which potential actions are relevant with respect to the data object being processed, method 600 then selects an action (or a next action) to evaluate in 620. Using the example actions provided above to facilitate the instant discussion, method 600 may select the "read" action as the first action to process at this point. In other embodiments, other actions can be selected here. Moreover, although FIG. 6 and the instant discussion are put forth in a logical manner for the sake of facilitating discussion herein, in practice these steps do not have to be performed in the same order as presented herein, nor must they be performed in a one-by-one manner. Thus, and for instance, at 620 method 600 may select multiple actions at the same time, and then store those actions in an array, list, or other such data structure.

Continuing with the discussion above, in step 630, method 600 evaluates the action that was selected in step 620. Evaluating the action involves analyzing the allowability of the selected in view of the data criticality score to determine if the action should be allowable. In one embodiment, this analysis is performed by comparing the selected action to the data criticality score. In other embodiments, this analysis can be performed, e.g., by using a tree structure, list, or other data structure to identify the appropriate outcome in view of the selected action, data criticality score, and other potential values. In other embodiments, this analysis can be performed in other manners. As a result of any such analysis, various permissions may be denied if a data object has a data criticality score that exceeds a predetermined threshold level, at least until the vulnerabilities get remediated. Although not expressly shown in FIG. 6, the method can also revoke permissions that were previously allowable, such as may result if a user event caused the system to regenerate the data criticality score and/or to generate a new data criticality score.

In step 640, method 600 determines if the action was found to be allowable, and if so, method 600 then proceeds to 650. In step 650, method 600 sets a value to indicate that the action is allowable, and method 600 then stores that value in a non-transient memory in step 670. In one embodiment, method 600 can migrate the data object to a desired storage tier based on the data criticality score. For instance, more sensitive data can be moved to a data storage location that has more stringent security policies (such as, e.g., a more stringent access control list policy) associated with that storage tier. If step 640 determines that the action was not found to be allowable, then method 600 proceeds to step 660. In step 660, method 600 sets a value to indicate that the action is not allowable, and method 600 then stores that value in a non-transient memory in step 670.

Moreover, although not expressly depicted in FIG. 6, method 600 can take other actions based on the data criticality score, in addition to setting and storing the values. For instance, if the data criticality score is high, the system may be configured to determine that the particular data object being analyzed requires a higher level of protection or access control than other data objects. In other embodiments, the system may be configured to determine that the repository in which that data object is stored requires a greater level of protection or access control that other repositories. In other embodiments, the system may be configured to determine that the source from which the data object was received requires a greater level of protection or access control that would otherwise be given. Moreover, in certain instances, the system may trigger an alert that the particular source from which the data object was received requires a software patch and/or increased security, due to the fact that the source machine is hosting a piece of sensitive or critical data. Moreover, in certain situations, the systems and methods disclosed herein can be applied to automatically revoke a user's access to a given data object based on the data criticality score. The specific functionality and actions that can be taken will be discussed in more detail below.

In step 680, method 600 then determines if any other actions remain to be evaluated. If step 680 determines that other actions do remain to be evaluated, method 600 loops back to step 620. As noted above, although FIG. 6 and the instant discussion are put forth in a logical manner for the sake of facilitating discussion herein, in practice these steps do not have to be performed in the same order as presented herein, nor must they be performed in a one-by-one manner. Thus, and for instance, at 620 method 600 may select multiple actions at the same time, and then store those actions in an array, list, or other such data structure. Conversely, if step 680 determines that other actions do remain to be evaluated, method 600 ends.

Figure 7:
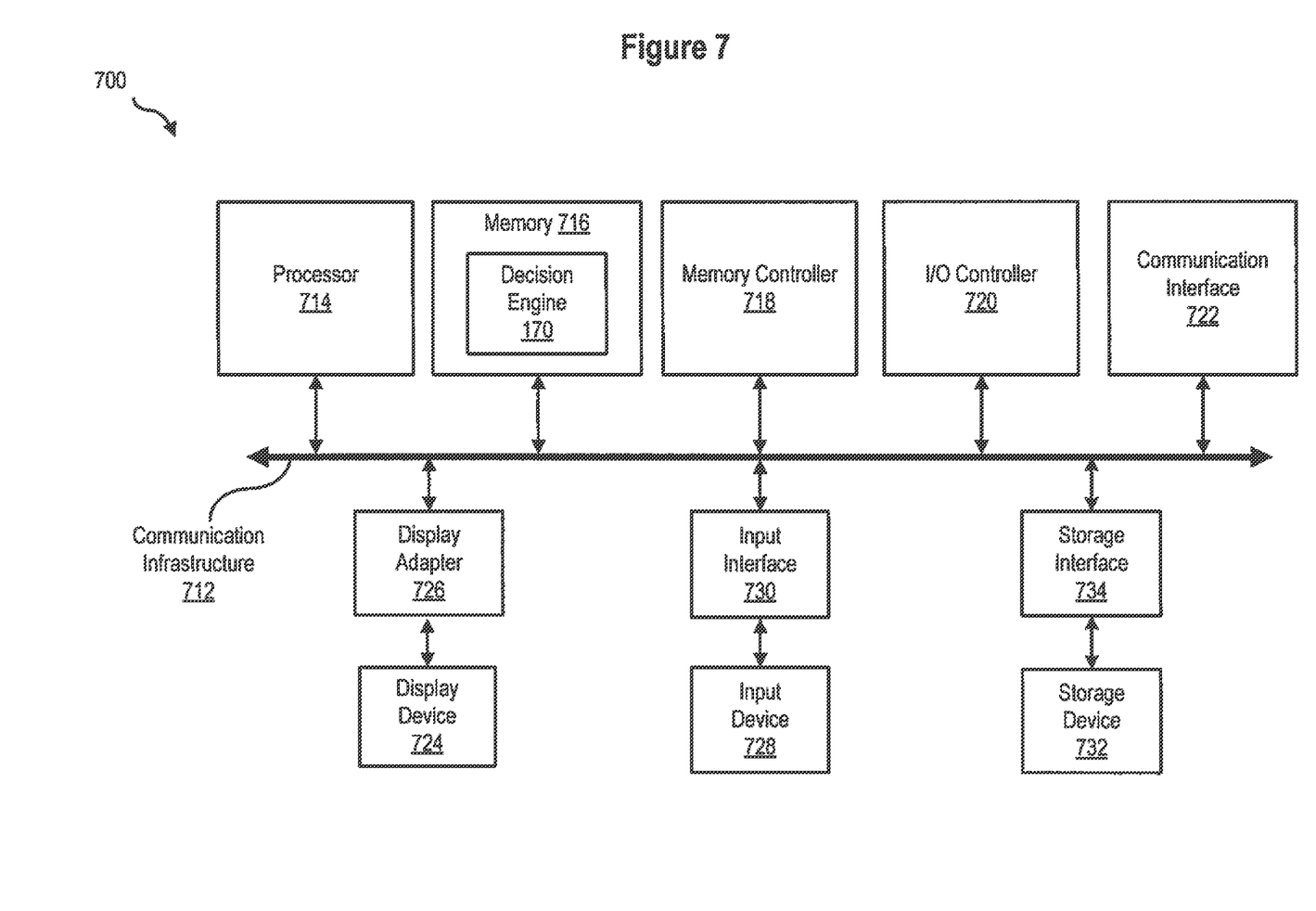
FIG. 7 is a block diagram of a computing device, illustrating how certain features of the instant disclosure can be implemented, according to one embodiment of the present disclosure.

FIG. 7 is a block diagram of a computing system 700 capable of performing one or more of the operations described above. Computing system 700 broadly represents any single or multi-processor computing device or system capable of executing computer-readable instructions. Examples of computing system 700 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 700 may include at least one processor 714 and a memory 716. By executing software that invokes decision engine 170, or any modifications thereof consistent with this disclosure, computing system 700 becomes a special purpose computing device that is configured to perform operations in the manner described above.

Processor 714 generally represents any type or form of processing unit capable of processing data or interpreting and executing instructions. In certain embodiments, processor 714 may receive instructions from a software application or module. These instructions may cause processor 714 to perform the functions of one or more of the embodiments described and/or illustrated herein. For example, processor 714 may perform and/or be a means for performing the operations described herein. Processor 714 may also perform and/or be a means for performing any other operations, methods, or processes described and/or illustrated herein.

Memory 716 generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 700 may include both a volatile memory unit and a non-volatile storage device. In one example, program instructions implementing on or more operations described herein may be loaded into memory 710.

In certain embodiments, computing system 700 may also include one or more components or elements in addition to processor 714 and memory 716. For example, as illustrated in FIG. 7, computing system 700 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI express (PCIe), or similar bus) and a network.

Memory controller 718 generally represents any type or form of device capable of handling memory or data or controlling communication between one or more components of computing system 700. For example, in certain embodiments memory controller 718 may control communication between processor 714, memory 716, and I/O controller 720 via communication infrastructure 712. In certain embodiments, memory controller 718 may perform and/or be a means for performing, either alone or in combination with other elements, one or more of the operations or features described and/or illustrated herein.

I/O controller 720 generally represents any type or form of module capable of coordinating and/or controlling the input and output functions of a computing device. For example, in certain embodiments I/O controller 720 may control or facilitate transfer of data between one or more elements of computing system 700, such as processor 714, memory 716, communication interface 722, display adapter 726, input interface 730, and storage interface 734.

Communication interface 722 broadly represents any type or form of communication device or adapter capable of facilitating communication between computing system 700 and one or more additional devices. For example, in certain embodiments communication interface 722 may facilitate communication between computing system 700 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 722 may also allow computing system 700 to engage in distributed or remote computing. For example, communication interface 722 may receive instructions from a remote device or send instructions to a remote device for execution.

As illustrated in FIG. 7, computing system 700 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer) for display on display device 724.

As illustrated in FIG. 7, computing system 700 may also include at least one input device 728 coupled to communication infrastructure 712 via an input interface 730. Input device 728 generally represents any type or form of input device capable of providing input, either computer or human generated, to computing system 700. Examples of input device 728 include, without limitation, a keyboard, a pointing device, a speech recognition device, or any other input device.

As illustrated in FIG. 7, computing system 700 may also include a storage device 732 coupled to communication infrastructure 712 via a storage interface 734. Storage device 732 generally represents any type or form of storage device or medium capable of storing data and/or other computer-readable instructions. For example, storage device 732 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage device 732 and other components of computing system 700. A storage device like storage device 732 can store information such as the data structures described herein, as well as one or more computer-readable programming instructions that are capable of causing a computer system to execute one or more of the operations described herein.

In certain embodiments, storage device 732 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 732 may also include other similar structures or devices for allowing computer software, data, or other computer-readable instructions to be loaded into computing system 700. For example, storage device 732 may be configured to read and write software, data, or other computer-readable information. Storage devices 732 may also be a part of computing system 500 or may be a separate device accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from that shown in FIG. 7.

Computing system 700 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 700 for storage in memory via a network such as the Internet or upon a carrier medium.

The non-transient computer-readable storage medium containing the computer programming instructions may be loaded into computing system 700. All or a portion of the computer programming instructions stored on the non-transient computer-readable storage medium may then be stored in memory 716 and/or various portions of storage device 732. When executed by processor 714, a computer program loaded into computing system 700 may cause processor 714 to perform and/or be a means for performing the functions of one or more of the embodiments described and/or illustrated herein. Additionally or alternatively, one or more of the embodiments described and/or illustrated herein may be implemented in firmware and/or hardware. For example, computing system 700 may be configured as an application specific integrated circuit (ASIC) adapted to implement one or more of the embodiments disclosed herein.

Figure 8:
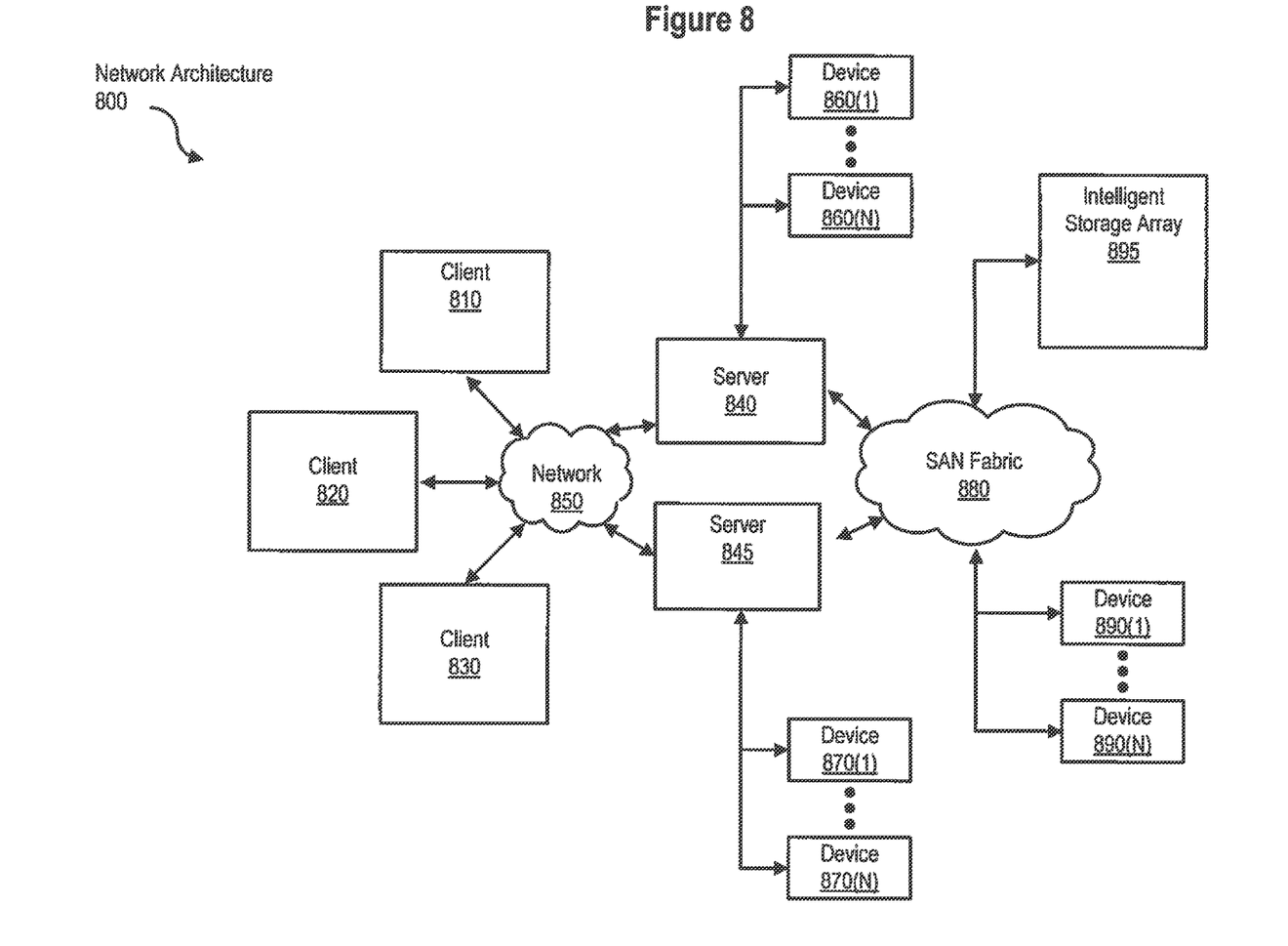
FIG. 8 is a block diagram of a networked system, illustrating how various computing devices can communicate via a network, according to one embodiment of the present disclosure.

FIG. 8 is a block diagram of a network architecture 800 in which client systems 810, 820, and 830, and servers 840 and 845 may be coupled to a network 850. Client systems 810, 820, and 830 generally represent any type or form of computing device or system, such as computing system 700 in FIG. 7.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet. In one example, one or more of client systems 810, 820, and/or 830 may include software configured to execute decision engine 170, and/or one or more components or threads thereof.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as Network File System (NFS), Server Message Block (SMB), or Common Internet File System (CIFS). Such storage devices can store backup information and storage configuration information, as described above.

Servers 840 and 845 may also be connected to a storage area network (SAN) fabric 880. SAN fabric 880 generally represents any type or form of computer network or architecture capable of facilitating communication between multiple storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to computing system 700 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 840, server 845, storage devices 840(1)-(N), storage devices 870(1)-(N), storage devices 890(1)-(N), intelligent storage array 895, or any combination thereof. All or a portion of one or more of the embodiments disclosed herein may also be encoded as a computer program, stored in server 840, run by server 845, and distributed to client systems 810, 820, and 830 over network 850.

In some examples, all or a portion of one of the systems in FIGS. 1A, 1B, 7, and 8 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
identifying a data object by a decision engine, wherein the data object is stored on a current storage tier in a network, wherein the network comprises a first node including the decision engine;
generating a data criticality score for the data object by the decision engine,
wherein
the generating the data criticality score for the data object is based, at least in part, on at least a first characteristic of the data object and a second characteristic of the data object, wherein the first characteristic and second characteristic are provided as inputs to the decision engine,
the generating determines the data criticality score for the data object, at least in part, by assigning a greater weight to the first characteristic than is assigned to the second characteristic, and
the data criticality score for the data object is configured for use in controlling a subsequent request for access to the data object;
determining whether the data criticality score for the data object exceeds a threshold; and
in response to determining that the data criticality score for the data object exceeds the threshold, migrating the data object from the current storage tier to a more secure storage tier, wherein the more secure storage tier has one or more security parameters that are more stringent than the current storage tier.

2. The method of claim 1, wherein
at least one of the first characteristic and the second characteristic comprises at least one of:
a classification of the data object,
a user account associated with the data object,
location information associated with the data object,
a first time associated with the data object,
a retention value associated with the data object, and
a number of access attempts associated with the data object.

3. The method of claim 1, further comprising:
configuring, by the decision engine, one or more parameters to be used to control actions that are executed on the data object based on the data criticality score of the data object, wherein
the configuring is performed prior to receiving subsequent requests for actions to be executed on the data object.

4. The method of claim 1, wherein
the first characteristic is assigned a first weight, wherein
the first weight is a first integer between one and ten inclusive;
the second characteristic is assigned a second weight, wherein the second weight is a second integer between one and ten inclusive; and
the first integer is not equal to the second integer.

5. The method of claim 1, further comprising:
determining whether a first action is allowable with respect to the data object,
wherein
the determining is based, at least in part, on the data criticality score;
subsequent to determining whether the first action is allowable with respect to the data object, setting a value to indicate whether the first action is allowable with respect to the data object, wherein
the value is configured to be used in controlling the subsequent request for access;
subsequent to setting the value, receiving a request to perform the first action on the data object; and
subsequent to receiving the request to perform the first action on the data object,
determining whether to grant the request, wherein
determining whether to grant the request is based, at least in part, on the value.

6. The method of claim 5, wherein
the determining whether to grant the subsequent request is further based, at least in part, on the first action.

7. The method of claim 5, further comprising:
in response to a determination that the subsequent request should be granted, performing the first action on the data object.

8. A computer program product, comprising a plurality of instructions stored on a non-transitory, computer-readable storage medium, wherein the instructions are configured to execute a method comprising the steps of:
identifying a data object by a decision engine, wherein the data object is stored on a current storage tier in a network, wherein
the network comprises a first node including the decision engine;
generating a data criticality score for the data object by the decision engine,
wherein
the generating the data criticality score for the data object is based, at least in part, on at least a first characteristic of the data object and a second characteristic of the data object, wherein the first characteristic and second characteristic are provided as inputs to the decision engine,
the generating determines the data criticality score for the data object, at least in part, by assigning a greater weight to the first characteristic than is assigned to the second characteristic, and
the data criticality score for the data object is configured for use in controlling a subsequent request for access to the data object;
determining whether the data criticality score for the data object exceeds a threshold; and
in response to determining that the data criticality score for the data object exceeds a threshold, migrating the data object from the current storage tier to a more secure storage tier, wherein
the more secure storage tier has one or more security parameters that are more stringent than the current storage tier.

9. The computer program product of claim 8, wherein
at least one of the first characteristic and the second characteristic comprises at least one of:
a classification of the data object,
a user account associated with the data object,
location information associated with the data object,
a first time associated with the data object,
a retention value associated with the data object, and
a number of access attempts associated with the data object.

10. The computer program product of claim 8, wherein the method further comprises:
configuring, by the decision engine, one or more parameters to be used to control actions that are executed on the data object based on the data criticality score of the data object, wherein
the configuring is performed prior to receiving subsequent requests for actions to be executed on the data object.

11. The computer program product of claim 8, wherein the method further comprises:
determining whether a first action is allowable with respect to the data object,
wherein
the determining is based, at least in part, on the data criticality score;
subsequent to determining whether the first action is allowable with respect to the data object, setting a value to indicate whether the first action is allowable with respect to the data object, wherein
the value is configured to be used in controlling the subsequent request for access;
subsequent to setting the value, receiving a request to perform the first action on the data object; and
subsequent to receiving the request to perform the first action on the data object,
determining whether to grant the request, wherein
determining whether to grant the request is based, at least in part, on the value.

12. The computer program product of claim 11, wherein the determining whether to grant the subsequent request is further based, at least in part, on the first action.

13. The computer program product of claim 11, wherein the method further comprises:

in response to a determination that the subsequent request should be granted, performing the first action on the data object.

14. A system comprising:
a microprocessor; and
a non-transitory, computer-readable storage medium, comprising computer instructions executable by the microprocessor, wherein the computer instructions are configured to perform a method comprising the steps of:
  identifying a data object by a decision engine, wherein
    the data object is stored on a current storage tier in a network, wherein
      the network comprises a first node including the decision engine;
  generating a data criticality score for the data object by the decision engine,
    wherein
      the generating the data criticality score for the data object is based, at least in part, on at least a first characteristic and a second characteristic related to the data object, wherein the first characteristic and second characteristic are provided as inputs to the decision engine,
      the generating determines the data criticality score for the data object, at least in part, by assigning a greater weight to the first characteristic than is assigned to the second characteristic, and
      the data criticality score for the data object is configured for use in controlling a subsequent request for access to the data object;
  determining whether the data criticality score for the data object exceeds a threshold; and
  in response to determining that the data criticality score for the data object exceeds the threshold, migrating the data object from the current storage tier to a more secure storage tier, wherein
    the more secure storage tier has one or more security parameters that are more stringent than the current storage tier.

15. The system of claim 14, wherein
at least one of the first characteristic and the second characteristic comprises at least one of:
  a classification of the data object,
  a user account associated with the data object,
  location information associated with the data object,
  a first time associated with the data object,
  a retention value associated with the data object, and
  a number of access attempts associated with the data object.

16. The system of claim 14, wherein the method further comprises:
  configuring, by the decision engine, one or more parameters to be used to control actions that are executed on the data object based on the data criticality score of the data object wherein
    the configuring is performed prior to receiving subsequent requests for actions to be executed on the data object.

17. The system of claim 14, wherein
the first characteristic is assigned a first weight, wherein
  the first weight is a first integer between one and ten inclusive;
the second characteristic is assigned a second weight, wherein
  the second weight is a second integer between one and ten inclusive; and
the first integer is not equal to the second integer.

18. The system of claim 14, wherein the method further comprises:
  determining whether a first action is allowable with respect to the data object,
    wherein
      the determining is based, at least in part, on the data criticality score;
  subsequent to determining whether the first action is allowable with respect to the data object, setting a value to indicate whether the first action is allowable with respect to the data object, wherein
    the value is configured to be used in controlling the subsequent request for access;
  subsequent to setting the value, receiving a request to perform the first action on the data object; and
  subsequent to receiving the request to perform the first action on the data object,
    determining whether to grant the request, wherein
      determining whether to grant the request is based, at least in part, on the value.

19. The system of claim 18, wherein
the determining whether to grant the subsequent request is further based, at least in part, on the first action.

20. The system of claim 18, wherein the method further comprises:
  in response to a determination that the subsequent request should be granted, performing the first action on the data object.

* * * * *